United States Patent [19]
Beal et al.

[11] Patent Number: 5,262,013
[45] Date of Patent: Nov. 16, 1993

[54] COOLANT RECYCLING METHOD AND APPARATUS

[75] Inventors: Roy E. Beal, Scottsdale; Scott A. McCracken, Tempe, both of Ariz.

[73] Assignee: Amalgamated Technologies, Inc., Scottsdale, Ariz.

[21] Appl. No.: 731,068

[22] Filed: Jul. 17, 1991

[51] Int. Cl.⁵ .......................... B01D 3/10; B01D 3/42
[52] U.S. Cl. ........................... 203/18; 202/160; 202/185.3; 202/202; 202/205; 202/264; 202/206; 203/1; 203/2; 203/3; 203/7; 203/20; 203/94; 203/98; 203/DIG. 18; 210/295; 210/916; 568/916; 568/918
[58] Field of Search .......................... 203/1-3, 203/18, 7, 91, 94, DIG. 18, 20, 98; 202/205, 264, 206, 185.3, 160, 202; 210/295, 916; 568/918, 916; 55/32

[56] References Cited

U.S. PATENT DOCUMENTS

| | | | |
|---|---|---|---|
| 2,341,281 | 2/1944 | McGovern | 203/2 |
| 3,039,941 | 6/1962 | Sweeney et al. | 203/2 |
| 3,505,173 | 4/1970 | Randell | 202/205 |
| 3,875,019 | 4/1975 | Cocuzza et al. | 203/18 |
| 3,999,943 | 12/1976 | Berry | 203/18 |
| 4,005,997 | 1/1977 | Fowler et al. | 55/84 |
| 4,010,065 | 3/1977 | Alleman | 203/18 |
| 4,015,369 | 4/1977 | Dietrick | 51/2 R |
| 4,080,247 | 3/1978 | Malakul | 159/17.1 |
| 4,182,659 | 1/1980 | Anwer et al. | 203/18 |
| 4,322,265 | 3/1982 | Wood | 203/26 |
| 4,344,828 | 8/1982 | Melton | 203/19 |
| 4,556,456 | 12/1985 | Ruckriegel et al. | 203/2 |
| 4,578,502 | 3/1986 | Admore | 568/858 |
| 4,630,572 | 12/1986 | Evans | 123/41.21 |
| 4,743,343 | 5/1988 | Sakai | 203/19 |
| 4,822,926 | 4/1989 | Dye | 568/867 |
| 4,946,595 | 8/1990 | Miller | 210/651 |
| 4,978,547 | 12/1990 | Petershans | 203/18 |
| 5,091,081 | 2/1992 | Hilgren | 210/295 |

FOREIGN PATENT DOCUMENTS 2267285 6/1974 France .
2664285 7/1990 France .

OTHER PUBLICATIONS

"Bad Ethyl Coolant Reclaimer", Finish Thompson, Inc., sales leaflet No. F90-300A-SP-10M and operational manual.
Patent Abstracts of Japan, vol. 2, No. 63; May 13, 1978; corresponding to Japanese Patent No. JP-A-53 24 665.

*Primary Examiner*—Virginia Manoharan
*Attorney, Agent, or Firm*—Leydig, Voit & Mayer

[57] ABSTRACT

A coolant recycling apparatus has a boiler and condenser for distilling a glycol and water from a used coolant. The glycol and water are recombined in a mixing tank to form a mixture having a desired ratio of water to glycol, and an inhibitor is added to the mixture to obtain a fresh coolant mixture ready for use in an engine cooling system. Contaminants in the used coolant are concentrated to form a sludge.

33 Claims, 2 Drawing Sheets

COOLANT RECYCLING METHOD AND APPARATUS

BACKGROUND OF THE INVENTION

This invention relates to a coolant recycling apparatus for converting used coolant, such as coolant for liquid-cooled engines, into fresh coolant having a quality equivalent to that of newly manufactured coolant.

The great majority of automotive vehicles, including trucks and passengers vehicles, employ liquid-cooled engines in which heat is removed from the engine by circulating a liquid coolant through a water jacket formed in the engine. The most common liquid coolants are mixtures of water and a cooling agent in the form of a glycol (ethylene glycol or propylene glycol). The ratio of water to glycol in the coolant will depend on the desired boiling and freezing points of the coolant, but is generally on the order of 50% water and 50% glycol by volume. The coolant usually also contains additives, generally referred to as inhibitors, which prevent rust corrosion and scaling inside the water jacket of an engine, water pump, radiator, and wherever else coolant is present in the cooling system for an engine.

Over long periods of use, the liquid coolant in an engine becomes contaminated with debris, rust, dirt, acids, metals, and corrosion products from the inside of the engine or radiator. Some of these contaminants decrease the cooling capacity of the coolant and others are harmful to metal portions of the cooling system. Furthermore, some of the inhibitors in the coolant deteriorate over time. When a coolant becomes contaminated or depleted, it is conventional to drain out the old coolant and replace it with a fresh coolant mixture. In many instances, the old coolant is simply discarded, either in land fills or directly into the sewer system. Since some glycols (particularly ethylene glycol) are toxic, and since the used coolant may contain lead and other metals produced by corrosion, the discarding of used coolant poses environmental problems. Furthermore, much of the glycol in used coolant is still perfectly usable as a coolant, so the discarding of used coolant represents a significant waste of valuable resources.

SUMMARY OF THE INVENTION

Accordingly, it is an object of the present invention to provide a recycling apparatus for liquid coolants containing water and a cooling agent which can economically recover water and the cooling agent from a used coolant mixture and prepare a fresh coolant mixture ready for use in a cooling system for an engine.

It is another object of the present invention to provide a coolant recycling apparatus which is substantially self-contained and requires only a source of electrical power to operate.

It is yet another object of the present invention to provide a cooling recycling apparatus which does not discharge harmful substances into the environment.

A coolant recycling apparatus according to the present invention distills a used coolant to recover water and a cooling agent such as ethylene glycol or propylene glycol as condensates. The condensed cooling agent is then mixed with water in a desired ratio, and an inhibitor is added to the mixture to obtain a fresh coolant mixture ready to be used as a coolant in a liquid-cooled engine. Contaminants in the used coolant are concentrated in the bottoms produced during distillation and can be economically disposed of in an environmentally safe manner.

The water with which the condensed cooling agent is mixed can be water from an external source, but preferably it is water which is obtained by the distillation of the used coolant.

DESCRIPTION OF THE PREFERRED EMBODIMENT

A number of embodiments of a coolant recycling apparatus according to the present invention will now be described with reference to the accompanying drawings, in which solid arrows indicate the direction of flow of liquids, while hollow arrows indicate the direction of flow of gases and vapors. In the embodiment depicted in the FIG. 1, a used coolant 11 is recycled and converted into a fresh coolant mixture. The used coolant 11 comprises water and a cooling agent which gives the coolant a boiling point and/or freezing point different from that of water. In the present embodiment, the cooling agent is ethylene glycol. However, the present invention is applicable to the recycling of any coolant containing a cooling agent which can be separated from water by distillation, such as propylene glycol.

Figure 1:
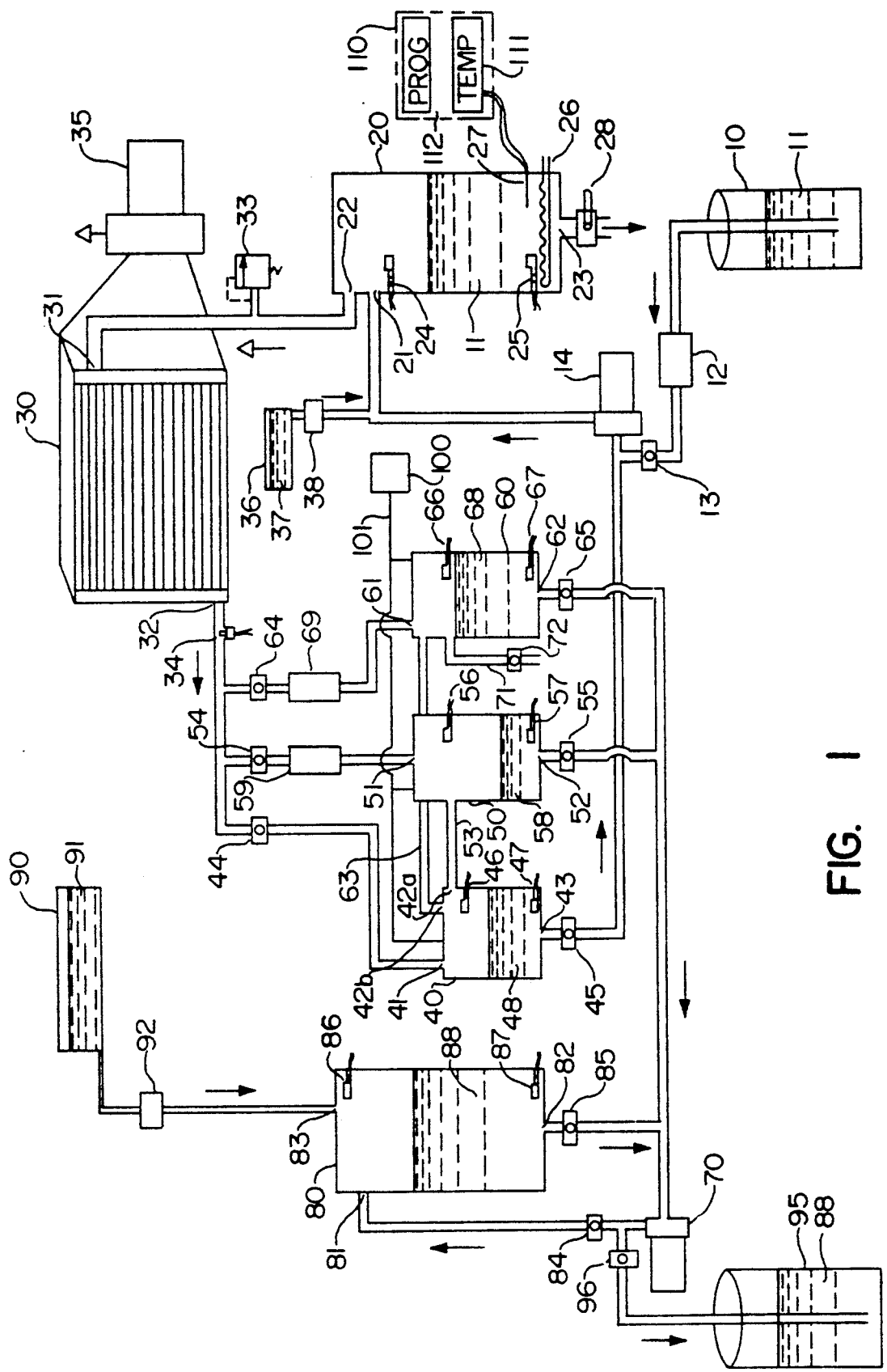
FIG. 1 and FIG. 2 are schematic diagrams of two different embodiments of a coolant recycling apparatus according to the present invention.

As shown in FIG. 1, the used coolant 11 to be recycled is drawn from a barrel 10 or other storage container by a feed pump 14 and supplied to a boiler 20 for evaporating the used coolant 11. The boiler 20 can be made of any material which has resistance to corrosion by glycols and other materials commonly found in used coolant. The boiler 20 is equipped with an inlet 21 for used coolant, a vapor outlet 22 for vapors generated in the boiler 20, and a drain 23 for removing concentrated sludge from the bottom of the boiler 20. Preferably, the top portion of the boiler 20 is removable to make it easier to clean out the boiler 20. The embodiment of FIG. 1 employs a single boiler 20, but a plurality of boilers 20 can be connected in parallel to increase the throughput of used coolant.

A prefilter 12, such as a conventional fiber particulate filter, is disposed on the upstream side of the feed pump 14 to remove oil, dirt, and other particulate contaminants from the used coolant 11 before it enters the boiler 20. A solenoid valve 13 is connected between the prefilter 12 and the feed pump 14. When the solenoid valve 13 is opened, used coolant 11 can be pumped into the boiler 20 from the barrel 10, while when the solenoid valve 13 is closed, the feed pump 14 can be used to pump liquid from other sources into the boiler 20. The drain 23 of the boiler 20 can be opened and closed by means of a drain valve 28.

High and low level sensors 24 and 25 installed in the boiler 20 for sensing the level of coolant 11 in the boiler 20 and providing corresponding output signals to a programmable control unit 110, which controls the operation of the apparatus. The boiler 20 is equipped with a heater 26 for boiling the used coolant 11 in the boiler 20 to generate water vapor and glycol vapor. For ease of control and safety reasons, an electric heater having a heating element submerged in the used coolant 11 is generally most suitable as the heater 26. However, any other type of heating device can be used, such as a gas heater. The heating element of the heater 26 is preferably resistant to corrosion by hot ethylene glycol and the various chemicals which are commonly found in used coolant mixtures. The heater 26 is turned on and off by the control unit 110.

The boiler 20 may also be equipped with a cooling device for cooling the boiler 20 between runs. Such a cooling device can comprise an external cooling jacket, a cooling fan, or an internal cooling coil. Any suitable fluid can be used in a cooling jacket or internal cooling coil, such as water. Alternatively, coolant being recycled by the apparatus can be employed so as to make the apparatus self-contained.

The boiler 20 is equipped with a temperature sensor 27 such as a thermocouple which generates an output signal corresponding to the temperature of the used coolant 11 in the boiler 20. The output signal of the temperature sensor 27 is provided to the control unit 110.

The water vapor and glycol vapor which are generated in the boiler 20 are condensed in a condenser 30 having an inlet 31 connected to the vapor outlet 22 of the boiler 20. The condenser 30 can be made of any material having resistance to glycol vapor, such as copper, aluminum, or steel. The condenser 30 can be equipped with a water cooling jacket or with a fan for blowing air over the condenser 30, but depending on the flow rate through the condenser 30, heat exchange with stationary air may be sufficient to condense the vapors passing through the condenser 30. The condenser 30 can instead be equipped with a liquid-cooled jacket using either water or coolant which is being recycled as a cooling liquid. In the present embodiment, the condenser 30 is equipped with a blower 35 which performs air cooling of the tubing of the condenser 30.

A relief valve 33 is installed between the vapor outlet 22 of the boiler 20 and the inlet 31 of the condenser 30 to prevent the buildup of high gas pressures should an obstruction develop in or downstream of the condenser 30. A temperature sensor 34 is installed near the outlet 32 of the condenser 30 to measure the temperature of the condensate from the condenser 30 in order to detect a cooling system failure or other problem such as foaming which could cause high temperature vapor or insufficiently cooled liquid to be present at the outlet of the condenser 30. The temperature sensor 34 provides the control unit 110 with a corresponding output signal.

Used coolant 11 tends to foam when it is boiled, and the formation of foam in the boiler 20 is undesirable since the foam may be carried over into the condenser 30. To prevent foaming, a preconditioner 37 containing a defoaming agent is preferably added to the used coolant 11 in the boiler 20. Any conventional defoaming agent can be employed, such as common long-chain polymer surfactants. The preconditioner 37 may also contain a descaling agent which prevents scaling on the inner surfaces of the boiler 20 during distillation. The preconditioner 37 is stored in a tank 36 and is automatically supplied to the boiler 20 at predetermined intervals by a metering pump 38 or other device capable of delivering precise quantities of liquid upon demand. The amount of preconditioner 37 to be added will depend on the amount of coolant 11 in the boiler 20 and the specific preconditioner 37 being employed. In the present embodiment, the preconditioner 37 is added to used coolant 11 as it is being pumped into the boiler 20 by feed pump 14 in order to ensure good mixing of the preconditioner 37 with the used coolant 11. Metering pump 38 is controlled by the control unit 110.

The outlet 32 of the condenser 30 is connected by piping to an intermediate recovery tank 40, a glycol recovery tank 50, and a water recovery tank 60. The piping defines a first flow path to the glycol recovery tank 50, a second flow path to the water recovery tank 60, and a third flow path to the intermediate recovery tank 40. The outlet 32 of the condenser 30 can be selectively connected to any of the flow paths. The glycol recovery tank 50 is for temporary storage of condensate 58 from the condenser 30 which is primarily glycol, the water recovery tank 60 is for temporary storage of condensate 68 from the condenser 30 which is primarily water, and the intermediate recovery tank 40 is for temporary storage of fluid which overflows the glycol recovery tank 50 and the water recovery tank 60 and also for temporary storage of condensate from the condenser 30 in which the percentage of glycol is such that it is undesirable to send the condensate to either the glycol recovery tank 50 or the water recovery tank 60.

The intermediate recovery tank 40 has a condensate inlet 41 15 connected to the outlet 32 of the condenser 30, overflow inlets 42a and 42b connected to the glycol recovery tank 50 and the water recovery tank 60, respectively, and a drain 43 connected to feed pump 14. An inlet solenoid 44 is disposed between the condensate inlet 41 and the condenser outlet 32 for stopping and enabling the flow of condensate from the condenser 30 to the intermediate recovery tank 40. An outlet solenoid 45 is disposed between the drain 43 of the intermediate recovery tank 40 and the feed pump 14 to control flow of intermediate condensate 48 between the intermediate recovery tank 40 and the boiler 20. The opening and closing of solenoid valves 44 and 45 is controlled by the control unit 110. A high level sensor 46 and a low level sensor 47 are disposed inside the intermediate recovery tank 40 and provide the control unit 110 with electrical input signals corresponding to the level of the intermediate condensate 48.

The glycol recovery tank 50 has an inlet 51 connected to the condenser outlet 32 by an inlet solenoid valve 54 and a drain 52 connected to a pump 70 by an outlet solenoid valve 55. An overflow pipe 53 is connected between the upper portion of the glycol recovery tank 50 and overflow inlet 42a of the intermediate recovery tank 40. When the inlet solenoid valve 54 is opened, condensate from the condenser 30 can drain into the glycol recovery tank 50, and when the outlet solenoid valve 55 is opened, pump 70 can be operated to withdraw glycol 58 from the tank 50. Solenoid valves 54 and 55 are controlled by the control unit 110. A high level sensor 56 is installed inside the glycol recovery tank 50 at approximately the level where the overflow pipe 53 opens onto the inside of the tank 50 to indicate when the tank 50 has become full, and a low level sensor 57 is installed near the bottom of the glycol recovery tank 50 to indicate when the tank 50 has become empty.

The water recovery tank 60 is similar in structure to the glycol recovery tank 50 and has an inlet 61 connected to the condenser outlet 32 by an inlet solenoid valve 64 and a drain 62 connected to pump 70 by an outlet solenoid valve 65. When the inlet solenoid valve 64 is opened, condensate from the condenser 30 can drain into the water recovery tank 60, and when the outlet solenoid valve 65 is opened, pump 70 can be operated to withdraw water 68 from the tank 60. Solenoid valves 64 and 65 are controlled by the control unit 110. An upper overflow pipe 63 is connected between the upper portion of the water recovery tank 60 and overflow inlet 42b of the intermediate recovery tank 40. A lower overflow pipe 71 is connected to the water recovery tank 60 at approximately the level of overflow pipe 53 of the glycol recovery tank 50. The overflow pipes 63 and 71 can be connected to a container for storing excess condensate 68 which accumulates in the water recovery tank 60, or if the glycol level in the condensate 68 is sufficiently low, the excess condensate 68 can be discharged directly into a sewer system. The lower overflow pipe 71 is opened and closed by a solenoid valve 72 controlled by the control unit 110. A high level sensor 66 is installed inside the water recovery tank 60 at approximately the level where the lower overflow pipe 71 opens onto the inside of the tank 60 to indicate when the tank 60 has become full, and a low level sensor 67 is installed near the bottom of the water recovery tank 60 to indicate when the tank 60 has become empty. Output signals from the level sensors 66 and 67 are provided to the control unit 110.

As will be described in greater detail below, the insides of recovery tanks 40, 50, and 60 are preferably maintained at subatmospheric pressure during operation of the boiler 20. If the downstream end of the lower overflow pipe 71 is at atmospheric pressure, condensate 68 can not be drained through the lower overflow pipe 71 while distillation is being performed. For this reason, the water recovery tank 60 is equipped with two overflow pipes 63 and 71 so that condensate 68 from the water recovery tank 60 can overflow into the intermediate recovery tank 40 when the boiler 20 is operating. However, if the insides of the recovery tanks are maintained at atmospheric pressure, or if the lower overflow pipe 71 drains into a container at the same pressure as the inside of the water recovery tank 60, the upper overflow pipe 63 may be dispensed with.

In the present embodiment, the volume of the glycol recovery tank 50 between its high level sensor 56 and its low level sensor 57 is substantially equal to the volume of the water recovery tank 60 between its high level sensor 66 and its low sensor 67, but it is also possible for the two volumes to be different.

The inlet solenoid valves 44, 54, and 64 are controlled by the control unit 110 based on the temperature sensed by the temperature sensor 27. The boiling temperature of the used coolant 11 in the boiler 20, which depends on the concentration and type of glycol in the used coolant 11, is directly correlated to the concentration of glycol in the condensate from the condenser 30. When the temperature in the boiler 10 is below a first predetermined temperature at which the condensate is primarily water, inlet solenoid valve 64 is opened and the other inlet solenoid valves 44 and 54 are closed to direct the condensate from the condenser 30 to the water recovery tank 60. When the temperature in the boiler 20 reaches the first temperature, inlet solenoid valve 44 is opened while the other inlet solenoid valves 54 and 64 are closed so that the condensate from the condenser 30 is directed to the intermediate recovery tank 40. When the temperature in the boiler 20 rises to a second predetermined temperature at which the condensate is primarily glycol, inlet solenoid valve 54 is opened and while the other inlet solenoid valves 44 and 64 are closed to direct condensate to the glycol recovery tank 50. The first and second temperature therefore define three different temperature ranges: a range having the first temperature as an upper limit, a range bounded by the first and second temperatures, and a range having the second temperature as a lower limit. The recovery tank to which condensate from the condenser 30 is directed depends upon the range in which the current temperature in the boiler 20 lies.

The temperatures at which the inlet valves 44, 54, and 64 are opened and closed will depend upon the desired concentration of glycol in the glycol recovery tank 50 and the water recovery tank 60. If the used coolant 11 in the boiler 10 is dilute to start with, i.e., if it has a lower glycol concentration than the fresh coolant mixture which is to be obtained, a greater volume of water will be generated by the apparatus than is necessary to manufacture fresh coolant, so it may be desirable to discard the excess water. In this case, the glycol concentration in the condensate 68 in the water recovery tank 60 is preferably as low as possible so that the excess condensate 68 can be discarded directly into a sewer system without causing pollution, so the first temperature is set at a level so as to limit the glycol concentration in the water recovery tank 60 to a low value, such as 0-4% by volume. When the condensate 58 collected in the glycol recovery tank 50 is to be stored instead of being immediately combined with water, the glycol concentration in the glycol recovery tank 50 is preferably as high as possible so as to reduce the volume of liquid collected in this tank 50, so the second temperature is set at a value so as to obtain a high glycol concentration in the glycol recovery tank, such as 96-98% by volume. Furthermore, the glycol concentration in each recovery tank 50 and 60 is chosen so as to obtain a desired glycol concentration when the condensate 58 in the glycol recovery tank 50 and the condensate 68 in the glycol recovery tank 60 are mixed.

Once the desired concentrations of glycol in recovery tanks 50 and 60 are determined, the corresponding first and second temperatures at which the control unit 110 is to operate the inlet solenoid valves 44, 54, and 64 can be estimated from known data and then fine tuned to local elevation and used coolant concentration. In the present embodiment, the temperature settings are calculated in advance by the operator of the apparatus and then input to the control unit 110 by the operator. However, the control unit 110 could be equipped with a calculating portion which automatically calculates the temperature settings from tables based on data input to the control unit 110 by the operator.

When suitable amounts of glycol and water have accumulated in the recovery tanks 50 and 60, outlet solenoid valves 55 and 65 are opened by the control unit 110, and glycol and water are pumped by pump 70 from the recovery tanks 50 and 60 into a mixing tank 80 where a fresh coolant mixture 88 is prepared. The mixing tank 80 has a coolant inlet 81 connected to the discharge side of pump 70 by an inlet solenoid valve 84, a drain 82 connected to the suction side of pump 70 by an outlet solenoid valve 85, and an inhibitor inlet 83 connected to a storage tank 90 for an inhibitor solution 91 by a metering pump 92 or other metering device. A high level sensor 86 and a low level sensor 87 are disposed inside the mixing tank 80 for indicating to the control unit 110 when the mixing tank 88 has become full or empty, respectively.

When condensate 58 from the glycol recovery tank 50 and condensate 68 from the water recovery tank 60 are added to the mixing tank 80 to form a fresh coolant mixture 88, the inhibitor solution 91 is automatically added to the mixture 88 from storage tank 90 by metering pump 92, which is controlled by the control unit 110. The inhibitor solution 91 contains a plurality of inhibitors for preventing corrosion of a cooling system in which the fresh coolant is to be used as well as pH adjusters, dyes, and the like. Any conventional inhibitor solution for use in engine coolants can be employed.

After the addition of the inhibitor solution 91, the fresh coolant mixture 88 in the mixing tank 80 can be pumped into a storage tank 95 or any other suitable container by pump 70 via a solenoid valve 96 connected to the discharge side of pump 70. With the arrangement shown in FIG. 1, the same pump 70 can be used both to fill and to empty the mixing tank 80. When it is desired to transfer water and glycol into the mixing tank 80, the control unit 110 turns on pump 70 with solenoid valves 55, 65, and 84 open and with solenoid valves 85 and 96 closed. On the other hand, when it is desired to transfer fresh coolant mixture 88 from the mixing tank 80 to storage tank 95, the control unit 110 turns on pump 70 with solenoid valves 85 and 96 open and with solenoid valves 84, 55, and 65 closed.

The fresh coolant mixture 88 is identical in quality to new coolant. Furthermore, because its concentration has been adjusted to a proper level for immediate use in a liquid-cooled engine, it can be used as is without any further treatment.

The concentration of glycol in the mixing tank 80 depends upon the glycol concentration in the condensates 58 and 68 in the glycol recovery tank 50 and the water recovery tank 60 and the amount of condensate from each recovery tank 50 and 60 which is combined in the mixing tank 80. In the embodiment of FIG. 1, equal amounts of fluid from the two recovery tanks 50 and 60 are mixed in the mixing tank 80, so the first and second predetermined temperatures which determine when the inlet solenoid valves 44, 54, and 64 are opened and closed are set so that the average of the glycol concentration in the glycol recovery tank 50 and the glycol concentration in the water recovery tank 60 equals the desired glycol concentration in the fresh coolant mixture 88 in the mixing tank 80. For example, if the first and second temperatures are set so that the glycol concentration of the condensate 58 in the glycol recovery tank 50 is approximately 98% by volume and the glycol concentration of the condensate 68 in the water recovery tank 60 is approximately 2% by volume and equal volumes from the two recovery tanks 50 and 60 are mixed in the mixing tank 80, a fresh coolant mixture 88 with a volume ratio of glycol to water of 50:50 can be obtained. In most regions, the desired glycol concentration in the fresh coolant mixture 88 is generally 40-60%, but the glycol concentration of the fresh coolant mixture 88 can be set to any desired value by adjusting the first and second temperatures and the mixing ratio. The mixing ratio can be adjusted by changing the heights of the level sensors in the recovery tanks 50 and 60, or by controlling the outlet solenoid valves 55 and 65 so that the two valves 55 and 65 are open for different lengths of time while fluid is being pumped from the recovery tanks 50 and 60 into the mixing tank 80 by pump 70. Generally, however, it is simpler to adjust the final glycol concentration in the mixing tank 80 by adjusting the temperatures at which inlet solenoid valves 44, 54, and 64 operate while maintaining a constant mixing ratio.

In the mode of operation just described, a fresh coolant mixture 88 prediluted to a concentration ready for immediate use in an engine cooling system is generated. However, it is also possible to pump concentrated glycol from the glycol recovery tank 50 directly into a storage container instead of first diluting it with water, and the concentrated glycol can be later mixed with water to obtain a desired concentration when it is ready to be used. A mode of operation in which the recovered glycol is pumped into a container without being first diluted is advantageous when there is inadequate storage space for fresh coolant mixture 88 (which occupies roughly twice the volume of the recovered glycol) or when the recovered coolant is to be used at a remote location, in which case it is cheaper to transport concentrated glycol than the prediluted fresh coolant mixture 88.

The boiler 20 can be operated at atmospheric or higher pressure, but in the present embodiment, during boiling, the inside of the boiler 20 is maintained at a subatmospheric pressure by a vacuum generating system 100 in order to decrease the boiling point of the used coolant 11. Lowering the boiling point of the used coolant 11 has the advantage that it reduces degradation and burning of glycols due to oxidation and reduces the formation of residue on the heater 26. Any means can be used as the vacuum generating system 100 for generating a subatmospheric pressure in the boiler 20, such as a vacuum pump or an air ejector connected to recovery tanks 40, 50, and 60 by a suction line 101. In general, a vacuum on the order of 8–10″ Hg in the boiler 20 is suitable. The system can be operated under a higher or lower vacuum if desirable. The vacuum generating system 100 is operated throughout the operating cycle of the boiler 20 so that the inside of the boiler 20 will be at a subatmospheric pressure both when the boiler 20 is generating primarily water vapor as well as when it is generating primarily glycol vapor.

If the output of the heater 26 is too high, burning and oxidation of the glycol in the used coolant 11 can occur, and the condensate from the condenser 30 will have a foul, acrid smell. Furthermore, the heater 26 becomes caked with a black, burnt residue which is difficult to remove, and the concentrated glycol sludge which is formed in the bottom of the boiler 20 has an extremely unpleasant odor which can make it necessary for an operator to wear a mask when cleaning out the boiler 20. Therefore, it is desirable to limit the output of the heater 26 so as to reduce burning and oxidation of the glycol in the used coolant 11. The suitable output level of the heater 26 will depend on the amount of coolant 11 in the boiler 20. However, in a boiler 20 having a capacity of 20 gallons, good results have been obtained with a heater having a heat density of less than 300 W/in$^2$.

Burning and oxidation of the glycol in the used coolant 11 can also be reduced by decreasing the output of the heater 26 when the temperature in the boiler 20 as indicated by the temperature sensor 27 is such as to indicate that most of the water in the used coolant 11 has been boiled off. For example, the heat density of the heater 26 can be initially set at 100% output and then reduced to 60% of full output when the temperature in the boiler 20 reaches a temperature needed to boil glycols.

Even when there is no significant burning or oxidation, the condensate from the condenser 30 often contains oil residue and odors. Therefore, odor absorbing filters 59 and 69 can be installed donwnstream of the condenser 30, such as between the condenser 30 and recovery tanks 50 and 60 to remove any burnt odor and oil residue from the condensate. An example of a suitable odor absorbing filter is an activated carbon filter.

As water and glycols are boiled off from the used coolant 11 in the boiler 20, salts, metals, acids, and other contaminants remain inside the boiler 20 as sediment and gradually form a concentrated sludge. At intervals, this sludge can be drained from the boiler 20 via the discharge drain 23 into a suitable container such as a leak-proof barrel. The volume of sludge produced as a waste product by the apparatus of the present invention is very small compared to the volume of coolant which is recycled (generally around 2-3% by volume), so it is possible to dispose of the waste sludge in an economical manner.

The control unit 110 can be any device capable of controlling the apparatus so as to obtain a coolant mixture in the mixing tank 80 having a desired glycol concentration. In the present embodiment the control unit 110 comprises a temperature controller 111 and a programmable controller 112. The temperature controller 111 receives input signals from the temperature sensor 27 and actuates the inlet solenoids 44, 54, and 64 at the above-described first and second predetermined temperatures. The temperature controller 111 has two temperature settings corresponding to the first and second temperatures. Below the first temperature, inlet solenoid valve 64 is open and inlet solenoid valves 44 and 54 are closed. When the temperature sensed by the temperature sensor 27 reaches the first temperature, the temperature controller 111 closes inlet solenoid valve 64 and opens inlet solenoid valve 44 to direct condensate to the intermediate recovery tank 40. When the temperature sensed by the temperature sensor 27 reaches the second temperature, the temperature controller 111 closes inlet solenoid valve 64 and opens inlet solenoid valve 54 to direct condensate to the glycol recovery tank 50. Instead of a single temperature controller with two temperature settings, two temperature controllers each having a single temperature setting can be employed.

The programmable controller 112 receives input signals from the level sensors in the various tanks and from various safety sensors, such as the condensate temperature sensor 34, and controls the operation of the various pumps, metering devices, and solenoid valves not controlled by the temperature controller 111 so as to operate in a predetermined sequence.

Both the temperature controller 111 and the programmable controller 112 can be off-the-shelf components. They may be separate units, or they may be combined into a single programmable device. The control unit 110 may also include an on-off switch, a mode select switch by means of which an operator can select the operating mode of the apparatus, a safety controller for shutting off the apparatus when an electrical fault is detected, and other conventional components.

An example of a method of operation of the embodiment of FIG. 1 will now be described. The coolant recycling process begins when the control unit 110 is switched either manually or automatically to a fill mode. In this mode, the control unit 110 checks whether the intermediate recovery tank 40 is empty based on the output signal of low level sensor 47. If there is any fluid in the intermediate recovery tank 40, outlet solenoid valve 45 is opened and feed pump 14 is turned on to pump this fluid into the boiler 20. When the fluid level in the intermediate recovery tank 40 falls to the low level sensor 47, outlet solenoid valve 45 is closed, and then solenoid valve 13 is opened to allow the feed pump 14 to pump used coolant 11 from the barrel 10 into the boiler 20 via the prefilter 12. At the same time, the metering pump 38 is operated to add preconditioner 37 into the used coolant 11 being pumped into the boiler 20. When the level of the used coolant 11 in the boiler 20 reaches the upper level sensor 24, solenoid valve 13 is closed and the feed pump 14 and the metering pump 38 are turned off.

The control unit 110 is then switched either manually or automatically to a distillation mode. In this mode, the heater 26, the blower 35 for the condenser 30, and the vacuum generating system 100 are switched on. The temperature in the boiler 20 starts to rise until the water in the used coolant 11 begins to boil. Vapor generated in the boiler 20 travels to the condenser 30, where heat is removed by air drawn through the condenser 30 by the condenser blower 35 to produce condensate 68 which is primarily water. This condensate 68 is discharged from the condenser 30 and flows through inlet solenoid valve 64 and filter 69 into the water recovery tank 60. During operation of the boiler 20, solenoid valve 72 on the lower overflow pipe 71 is closed. Therefore, condensate 68 can accumulate in the water recovery tank 60 until it reaches the upper overflow pipe 63, through which the excess condensate 68 drains into the intermediate recovery tank 40.

When the temperature of the used coolant 11 in the boiler 20 reaches the first predetermined temperature, the temperature controller 111 closes inlet solenoid valve 64 and opens inlet solenoid valve 44 to direct the condensate 48 from the condenser 30 into the intermediate recovery tank 40. Since the condensate 48 which is sent to the intermediate recovery tank 40 will be redistilled later on, it is not necessary to filter it at this time.

When the temperature of the used coolant 11 in the boiler 20 reaches the second predetermined temperature, inlet solenoid valve 44 is closed and inlet solenoid valve 54 is opened to direct condensate 58, which is primarily glycol, to the glycol recovery tank 50.

Boiling of used coolant 11 continues until the fluid level in the boiler 20 falls to the low lever sensor 25, at which time the heater 26 and the vacuum generating system 100 are turned off. The control unit 110 then waits to allow the pressure within the apparatus to return to atmospheric pressure and to allow the fluid remaining in the boiler 20 to cool down below the boiling point of water. When the apparatus has returned to a suitable pressure and temperature, the control unit 110 can then be switched, either manually or automatically, to the fill mode in order to refill the boiler 20 with liquid from the intermediate recovery tank 40 and the barrel 10.

Once the vacuum generating system 100 is turned off, solenoid valve 72 on the lower overflow pipe 71 can be opened to drain any excess condensate 68 from the water recovery tank 60 and decrease the level of condensate 68 to the level of high level sensor 66.

At this time, if high level sensors 56 and 66 indicate that both the glycol recovery tank 50 and the water recovery tank 60 are full, solenoid valves 55 and 65 and solenoid valve 84 are opened and pump 70 is turned on to pump condensates 58 and 68 from recovery tanks 50 and 60 into the mixing tank 80. Pump 70 continues to operate until low level sensors 57 and 67 indicate that both recovery tanks 50 and 60 are empty. The recovery tanks 50 and 60 can be emptied simultaneously or sequentially. When recovery tanks 50 and 60 are empty, valves 55, 65, and 84 are closed and pump 70 is turned off. Metering pump 92 is then turned on to add a suitable amount of inhibitor solution 91 to the mixing tank 80.

When fresh coolant mixture 88 is present in the mixing tank 80, the control unit 110 can be switched either manually or automatically to a "coolant out" mode in which outlet solenoid valve 85 and solenoid valve 96 are opened and pump 70 is turned on to pump fresh coolant mixture 88 from the mixing tank 80 into the storage tank 95. The programmable controller 112 can be programmed to automatically switch to the "coolant out" mode when the fluid level in the mixing tank 80 reaches high level sensor 86. Furthermore, it is possible for the apparatus to operate in the "coolant out" mode at the same time that it is operating in the fill mode or the distillation mode.

The control unit 110 automatically shuts down the apparatus when the condensate temperature indicated by temperature sensor 34 exceeds a prescribed level or when the relief valve 33 operates in response to excess pressure within the boiler 20.

Although the embodiment of FIG. 1 is equipped with a programmable control unit 110, a control device of this type is not essential to the operation of the present invention. If the solenoid valves are replaced by manually-operated control valves and the temperature sensor 27 is replaced by a temperature gauge, the entire apparatus can be manually controlled by a human operator who opens and closes the valves at suitable boiler temperatures as indicated by the temperature gauge. Thus, a recycling apparatus according to the present invention can be operated as a fully manual system, a semiautomatic system, or as a fully automatic system.

The glycol concentration of the used coolant 11 may vary considerably from run to run, depending on the source of the used coolant 11. Used coolant collected from automobiles at gas stations commonly varies from 20% to 80% glycol by volume. However, since a glycol recycling apparatus according to the present invention separates glycol and water from used coolant 11 by distillation and then remixes them, a fresh coolant mixture 88 having a desired glycol concentration can be obtained regardless of the initial glycol concentration of the used coolant 11.

In most instances, the desired glycol concentration of the fresh coolant mixture 88 is higher than the glycol concentration of the used coolant 11. In some instances, however, the reverse may be true, and the amount of water recovered from the used coolant 11 may be inadequate to obtain the desired glycol concentration in the fresh coolant mixture 88. In such cases, additional water may be added to the apparatus from an external source.

A coolant recycling apparatus according to this embodiment requires only a source of electrical power for the heater 26, the vacuum generating system 100, the condenser blower 35, the control unit 110, and the various pumps and valves, so it can be operated wherever electrical power is available. Except for the small amount of sludge which is formed in the bottom of the boiler 20 and any dilute condensate 68 which overflows from the water recovery tank 60, there is very little discharge of materials to the outside of the apparatus. Most of the glycol in the used coolant 11 is recovered in the fresh coolant mixture 88, and any excess water in the used coolant 11 not needed for producing the fresh coolant mixture 88 can be purified in the apparatus to the point that it can be safely discharged into a sewer system. Therefore, the present invention is highly advantageous from the standpoint of environmental cleanliness.

In most areas of the United States, the desired glycol concentration of the fresh coolant mixture 88 is at least 50% by volume. However, the used coolant 11 in the boiler 20 may have an initial glycol concentration which is considerably lower than this. In such cases, a significant amount of the condensate 68 collected in the water recovery tank 60 is not needed for the manufacture of the fresh coolant mixture 88. In order for the excess condensate 68 to be discarded without polluting the environment, its glycol concentration must be limited to a low level, such as 5% or less, and condensate from the condenser 30 having a glycol concentration higher than this is directed to the intermediate recovery tank 40 or the glycol recovery tank 50. Because of the low limit on the glycol concentration in the condensate 68 in the water recovery tank 60, a large portion of the condensate from the condenser 30 ends up being sent to the intermediate recovery tank 40 and then redistilled. Since redistillation decreases the efficiency of the apparatus, it is desirable to be able to minimize the amount of condensate sent to the intermediate recovery tank 40.

Figure 2:
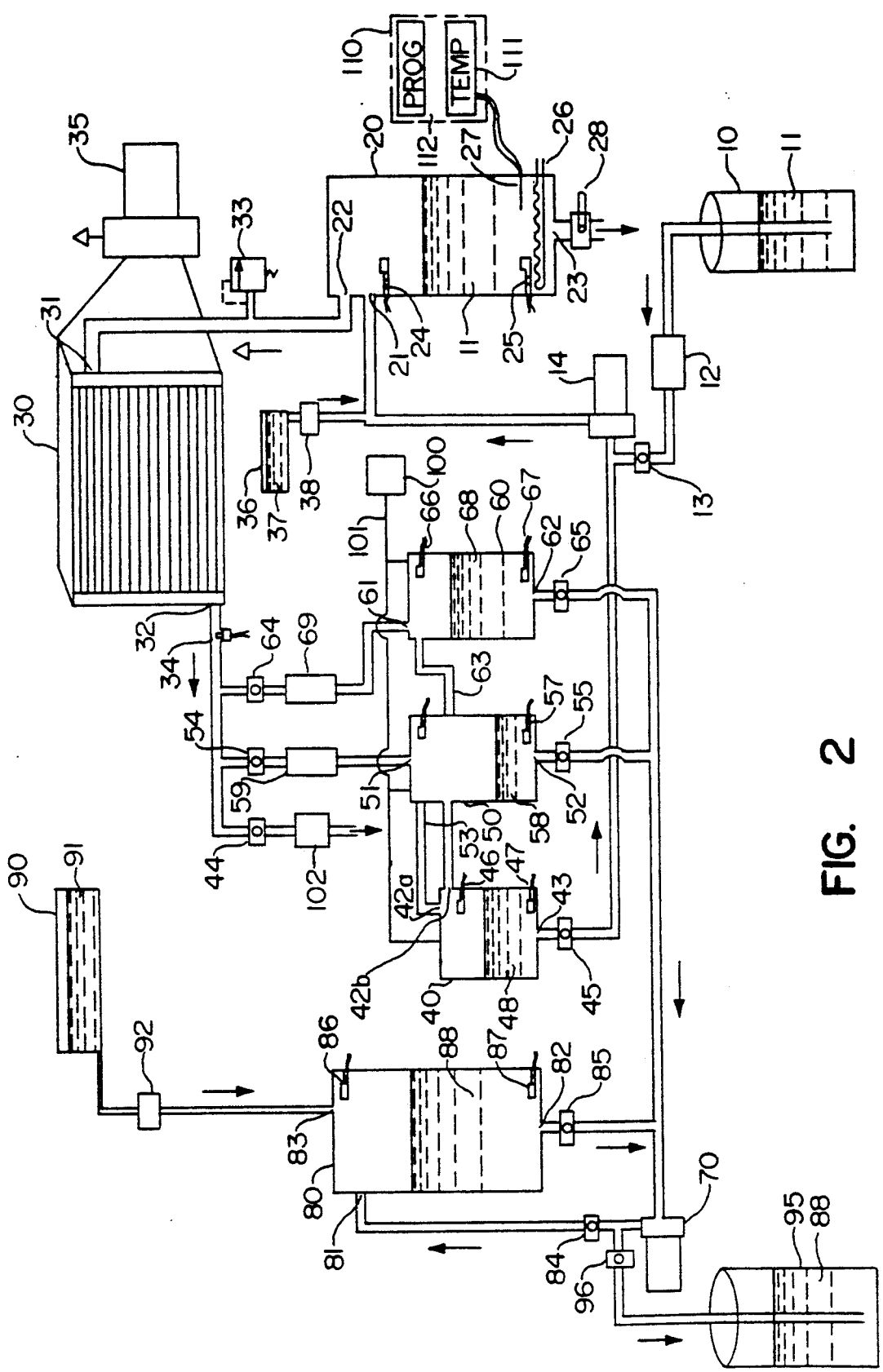

FIG. 2 schematically illustrates a second embodiment of the present invention which can greatly reduce the amount of condensate that is redistilled. In this embodiment, in the initial stage of distillation of the used coolant 11, condensate having a low concentration of glycol is discarded rather than collected. The condensate continues to be discarded until the glycol concentration in the used coolant 11 (as indicated by the rising temperature of the used coolant 11) reaches a point such that all the condensate which is thereafter generated can be used to manufacture fresh coolant without it being necessary to perform redistillation of the condensate. From this point on, all the condensate is collected.

The structure of the embodiment of FIG. 2 is similar to that of the embodiment of FIG. 1. As in the embodiment of FIG. 1, the condenser outlet 32 can be selectively connected to any one of three flow paths defined by piping, i.e., a first flow path to the glycol recovery tank 60, a second flow path to the water recovery tank 50, and a third flow path. However, in contrast to the embodiment of FIG. 1, the third flow path no longer connects the condenser outlet 32 directly to the intermediate recovery tank 40 but instead connects the condenser outlet 32 to a second vacuum generating system 102 through a solenoid valve 103 which is controlled by the temperature controller 111 of the control unit 110. The second vacuum generating system 102 can be any device capable of generating a subatmospheric pressure and passing fluid at the same time, such as a pump or an air ejector. The discharge side of the second vacuum generating system 102 can be connected to a container for water or can be connected directly to a sewer system. The second overflow pipe 71 of the embodiment of FIG. 1 has been deleted, and the high level sensors 56 and 66 have been moved to approximately the levels of the overflow pipe 53 of the glycol recovery tank 50 and the first overflow pipe 63 of the water recovery tank 60, respectively. In this embodiment, the volume of the glycol recovery tank 50 between its high level sensor 56 and its low level sensor 57 is substantially equal to the volume of the water recovery tank 60 between its high level sensor 66 and its low level sensor 67. The structure of this embodiment is otherwise the same as that of the embodiment of FIG. 1.

As in the embodiment of FIG. 1, the temperature controller 111 opens and closes inlet valves 54 and 64 and solenoid valve 103 at first and second predetermined temperatures. When the temperature measured by the temperature sensor 27 is below the first temperature, solenoid valve 103 is opened and inlet solenoid valves 54 and 64 are closed so that condensate from the condenser 30 is drawn through the second vacuum generating system 102 and either collected for later disposal or directed to a drain immediately. When the temperature in the boiler 20 reaches the first temperature, the temperature sensor 111 closes solenoid valve 103 and opens inlet solenoid valve 64 to direct condensate to the water recovery tank 60. When the temperature in the boiler 20 reaches the second temperature, the temperature controller 111 closes inlet solenoid valve 64 and opens inlet solenoid valve 54 to direct condensate to the glycol recovery tank 50. The first temperature is preferably chosen so that glycol concentration of the condensate at the first temperature will be sufficiently low that the condensate can be discarded into a sewer system without producing any pollution. Generally, the first temperature is set so that the glycol concentration of the condensate will be in the range of approximately 2 to approximately 4% by volume, but the first temperature can be varied in accordance with local standards for water purity. At this temperature, the glycol concentration in the used coolant 11 is preferably high enough that a new coolant mixture having a glycol concentration of approximately 40-60% by volume can be obtained from the used coolant 11 without having to redistill any of the condensate. The second temperature is chosen so that when the condensate 58 in the glycol recovery tank 50 is mixed with the condensate 68 in the water recovery tank 60 in the mixing tank 80, the resulting fresh coolant mixture 88 will have a desired glycol concentration. In the present embodiments, equal volumes of condensates 58 and 68 are mixed, so the second temperature is chosen so that the average of the glycol concentration of the condensate 68 in the water recovery tank and the glycol concentration of the condensate in the glycol recovery tank 50 equals the desired concentration of the fresh coolant mixture 88 in the mixing tank 80. For example, if the desired glycol concentration is 50% by volume, the second temperature is chosen such that the glycol concentrations in recovery tanks 50 and 60 add up to 100% by volume. The first and second temperatures will depend upon the operating pressure in the boiler 20 and can be readily determined either manually or automatically from known data.

The operation of this embodiment is similar to that of the embodiment of FIG. 1 with the difference that condensate is never sent directly to the intermediate recovery tank 40. In the initial stage of distillation, condensate having a glycol concentration below a prescribed value passes through solenoid valve 103 and is discharged from the second vacuum generating system 102. Subsequently, all condensate is directed either to the glycol recovery tank 50 or the water recovery tank 60, and only that condensate which overflows either of recovery tanks 50 or 60 is introduced into the intermediate recovery tank 40. The intermediate recovery tank 40 therefore functions as an overflow tank. The volume of fluid which is introduced into the intermediate recovery tank 40 and has to be redistilled is much less than in the embodiment of FIG. 1, so the efficiency of embodiment of FIG. 2 is much higher in terms of the amount of boiling and the length of time required to obtain a given quantity of fresh coolant mixture. Condensate which collects in recovery tanks 50 and 60 is mixed in the mixing tank 80 to obtain a fresh coolant mixture 88 in the same manner as in the embodiment of FIG. 1.

When the used coolant 11 in the boiler 20 reaches the first temperature, then if the glycol concentration of the recoverable used coolant 11 remaining in the boiler is substantially equal to the desired glycol concentration of the fresh coolant mixture, it is then not necessary to divide the condensate among two different recovery vessels according to the glycol concentration of the condensate, and it is possible to direct all the condensate to only a single recovery vessel, such as the glycol recovery vessel 60. The condensate collected in the glycol recovery vessel 60 can than be transferred to the mixing tank 80 without it being necessary to perform any prior combination.

In the embodiment of FIG. 2, the second vacuum generating system 102 is provided so that a subatmospheric pressure can be maintained in the boiler 20 when inlet solenoid valves 54 and 64 are closed. However, in situations when it is desired to operate the boiler 20 at atmospheric pressure, both of the vacuum generating systems 100 and 102 can be omitted.

Although the present invention is particularly suited for recycling liquid coolant for engines, it can be used to recycle solutions other than those based on propylene glycol or ethylene glycol. For example, it can be used to recycle or concentrate soluble oils, tool coolants, deicers, and general waste water solutions.

What is claimed is:

1. A coolant recycling apparatus for recycling a used coolant mixture containing a cooling agent and water, the apparatus comprising:
   a boiler for boiling the used coolant mixture to generate water vapor and cooling agent vapor;
   a condenser for condensing the vapors from the boiler to generate a condensate, the condenser having an inlet connected to the boiler and an outlet;
   a temperature sensor for sensing the temperature of the used coolant mixture in the boiler;
   flow directing means for defining first, second, and third flow paths for condensate from the condenser and for selectively connecting the outlet of the condenser to one of the flow paths;
   a cooling agent recovery vessel connected to the first flow path for collecting condensate from the condenser; and
   control means for controlling the flow directing means in accordance with the temperature sensed by the temperature sensor.

2. A coolant recycling apparatus as claimed in claim 1 further comprising mixing means for mixing condensate collected in the cooling agent recovery vessel with water to obtain a mixture.

3. A coolant recycling apparatus as claimed in claim 2 further comprising means for adding a corrosion inhibitor and additive composition to the mixture obtained by the mixing means to create new coolant.

4. A coolant recycling apparatus as claimed in claim 1 wherein the control means comprises means for controlling the flow directing means to connect the condenser outlet to the first flow path when the temperature sensed by the temperature sensor is in a first range in which the condensate comprises primarily the cooling agent and to connect the condenser outlet to the second flow path when the temperature sensed by the temperature sensor is in a second range below the first range.

5. A coolant recycling apparatus as claimed in claim 4 further comprising a water recovery vessel connected to the second flow path.

6. A coolant recycling apparatus as claimed in claim 5 further comprising mixing means for mixing condensate collected in the cooling agent recovery vessel and condensate collected in the water recovery vessel to obtain a mixture.

7. A coolant recycling apparatus as claimed in claim 6 wherein the mixing means comprises means for automatically adjusting the content of cooling agent in the mixture obtained by the mixing means to approximately 40-60% by volume.

8. A coolant recycling apparatus as claimed in claim 4 further comprising an intermediate recovery vessel connected to the third flow path, wherein the control means comprises means for controlling the flow directing means to connect the condenser to the third flow path when the temperature sensed by the temperature sensor is in a third range between the first and second ranges.

9. A coolant recycling apparatus as claimed in claim 8 further comprising means for returning condensate which collects in the intermediate recovery vessel to the boiler.

10. A coolant recycling apparatus as claimed in claim 8 wherein the concentration of the cooling agent in the condensate from the condenser is sufficiently low that the condensate can be safely discarded into a sewage system when the temperature sensed by the temperature sensor is in the second range.

11. A coolant recycling apparatus as claimed in claim 6 wherein the control means comprises means for controlling the flow directing means to connect the condenser to the third flow path when the temperature sensed by the temperature sensor is in a third range below the second range.

12. A coolant recycling apparatus as claimed in claim 11 further comprising an overflow vessel, overflow pipes connecting the cooling agent recovery vessel and the water recovery vessel with the overflow vessel, and means for returning condensate which overflows into the overflow vessel from the cooling agent recovery vessel and the water recovery vessel to the boiler.

13. A coolant recycling apparatus as claimed in claim 11 wherein the concentration of the cooling agent in the condensate from the condenser is sufficiently low that the condensate can be safely discarded into a sewage system when the temperature sensed by the temperature sensor is in the third range.

14. A coolant recycling apparatus as claimed in claim 1 further comprising vacuum generating means for generating a subatmospheric pressure in the boiler when the boiler is generating primarily water vapor and when the boiler is generating primarily cooling agent vapor.

15. A coolant recycling apparatus as claimed in claim 1 further comprising means for adding an anti-foaming agent to the used coolant mixture in the boiler.

16. A coolant recycling apparatus as claimed in claim 1 further comprising a filter for removing odors from the condensate from the condenser disposed along one of the flow paths.

17. A coolant recycling apparatus as claimed in claim 1 wherein the boiler comprises a heater for heating the used coolant mixture in the boiler, and the control means comprises means for decreasing the heat density of the heater when the temperature int he boiler exceeds a prescribed level.

18. A coolant recycling apparatus as claimed in claim 1 wherein the condenser is an air-cooled condenser.

19. A coolant recycling apparatus for recycling a used coolant mixture containing a cooling agent and water, the apparatus comprising:
a boiler for boiling the used coolant mixture to generate water vapor and cooling agent vapor;
a condenser for condensing the vapors from the boiler to generate a condensate, the condenser having an inlet connected to the boiler and an outlet;
a temperature sensor for sensing the temperature of the used coolant mixture in the boiler;
flow directing means for defining plurality of flow paths for condensate from the condenser and for selectively connecting the outlet of the condenser to one of the flow paths;
a cooling agent recovery vessel connected to one of the flow paths; and
control means responsive to the temperature sensor for controlling the flow directing means to divert the flow of condensate from one of the flow paths to another of the flow paths at two different temperatures.

20. A method for recycling a glycol-containing coolant comprising:
distilling a used coolant mixture comprising a glycol and water to generate water vapor and glycol vapor and then generate a condensate; and
directing the condensate along a first, second, or third flow path when the temperature of the used coolant mixture is in a first, a second, or a third range, respectively, the condensate comprising primarily glycol vapor when the temperature of the used coolant mixture is in the first range;
mixing the condensate directed along the first flow path with water to obtain a mixture.

21. A method as claimed in claim 20 wherein the mixing comprises mixing the condensate directed along the first flow path with the condensate directed along one of the other flow paths.

22. A method as claimed in claim 21 wherein:
the condensate comprises primarily water when the temperature of the used coolant mixture is in the second temperature range;
the second range is below the third range; and
the mixing comprises mixing the condensate directed along the first flow path with the condensate directed along the second flow path.

23. A method as claimed in claim 22 further comprising redistilling the condensate directed along the third flow path.

24. A method as claimed in claim 22 wherein the condensate directed along the second flow path has a glycol concentration which is sufficiently low that the condensate can be safely discarded into a sewage system.

25. A method as claimed in claim 21 wherein the condensates are mixed so as to obtain a mixture with a glycol concentration of approximately 40-60% by volume.

26. A method as claimed in claim 21 wherein:
the condensate comprises primarily water when the temperature of the used coolant mixture is in the third temperature range;

the second range is between the first and third ranges; and the mixing comprises mixing the condensate directed along the first flow path with the condensate directed along the second flow path.

27. A method as claimed in claim 26 wherein the condensate directed along the third flow path has a glycol concentration which is sufficiently low that the condensate can be safely discarded into a sewage system.

28. A method as claimed in claim 26 wherein the third temperature range has an upper end, and the concentration of glycol in the used coolant mixture at the upper end of the third temperature range is high enough to enable a mixture having a glycol concentration of approximately 40–60% by volume to be recovered from the used coolant.

29. A method as claimed in claim 26 comprising discarding the condensate directed along the third flow path.

30. A method as claimed in claim 20 wherein the distilling comprises heating the used coolant mixture with a heater at a heat density which decreases as the temperature of the used coolant mixture increases.

31. A method for recycling a glycol-containing coolant comprising:

distilling and measuring the temperature of a used coolant mixture comprising a glycol and water to generate water vapor and glycol vapor and then generate a condensate;

discarding the condensate when the temperature of the used coolant mixture is below a first temperature corresponding to a glycol concentration in the condensate within a prescribed range of approximately 0–4% by volume; and saving the condensate when the concentration of the glycol in the condensate is above the prescribed range.

32. A method as claimed in claim 31 further comprising:

collecting the condensate in a water recovery tank when the temperature of the used coolant mixture is between the first temperature and a second temperature higher than the first temperature;

collecting the condensate in a glycol recovery tank when the temperature of the used coolant mixture is above the second temperature; and mixing condensate from the water recovery tank with condensate from the glycol recovery tank to obtain a new mixture.

33. A method as claimed in claim 32 wherein the new mixture has a glycol concentration in the range of approximately 40–60% by volume.

* * * * *